United States Patent [19]

Kubacki et al.

[11] 4,026,171

[45] May 31, 1977

[54] SHUTTLE TRANSFER MECHANISM

[75] Inventors: Edward Frank Kubacki, Arlington Heights; Harold Charles Lemke, Grayslake; George Alan Schmidt, Barrington; Vance Burton Gold, Lombard; Harold James Jessogne, Arlington Heights, all of Ill.

[73] Assignee: American Can Company, Greenwich, Conn.

[22] Filed: Apr. 28, 1975

[21] Appl. No.: 572,187

[52] U.S. Cl. .................................. 82/102; 82/2.7
[51] Int. Cl.² .................. B23B 5/14; B23B 13/10
[58] Field of Search ............. 82/101, 102, 2.5, 2.7; 221/172, 312

[56] References Cited
UNITED STATES PATENTS

| | | | |
|---|---|---|---|
| 1,690,541 | 11/1928 | Kuzelewski | 29/42 |
| 2,047,021 | 7/1936 | Friden | 221/312 R |
| 2,388,355 | 11/1945 | Fether | 82/2.7 |
| 2,910,919 | 11/1959 | Rye | 82/2.7 X |
| 3,306,688 | 2/1967 | Di Domenico | 221/312 R |
| 3,714,854 | 2/1973 | Kubacki | 82/101 R |

*Primary Examiner*—Leonidas Vlachos
*Attorney, Agent, or Firm*—Robert P. Auber; Ira S. Dorman; George P. Ziehmer

[57] ABSTRACT

Work pieces, particularly thin-walled shells of can dimension, are transferred from a magazine at a supply station to another station by a reciprocal shuttle having a pocket for receiving the shells in ready position at the supply station; at the other station, a reciprocal loader transfers the shell laterally from the shuttle to a work station where the work product is produced. The shuttle incorporates a second pocket to receive the work product and includes a surface for gating the supply magazine as an incident to shuttle travel. By locating the path of the shuttle above the path of the loader, it is possible to coordinate shuttle and loader movement for maximum utilization of time. Shells fed to the magazine are constantly aligned inside the magazine to assure effective bottom feed from the magazine to the shuttle.

7 Claims, 10 Drawing Figures

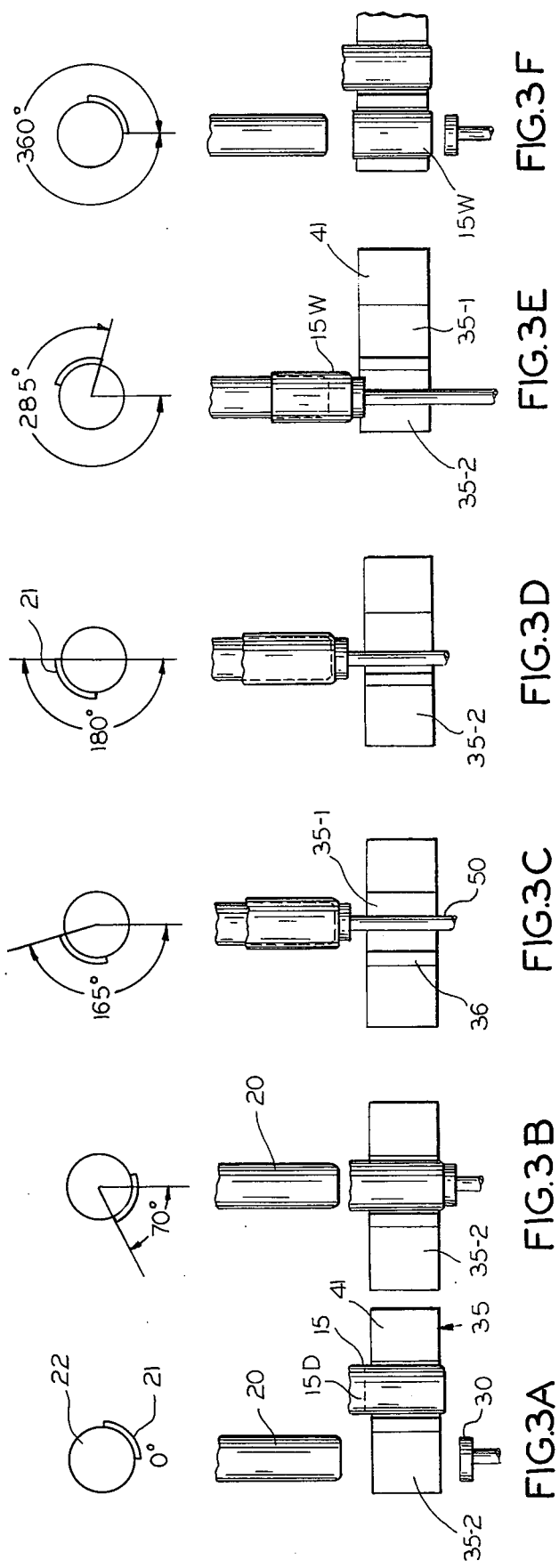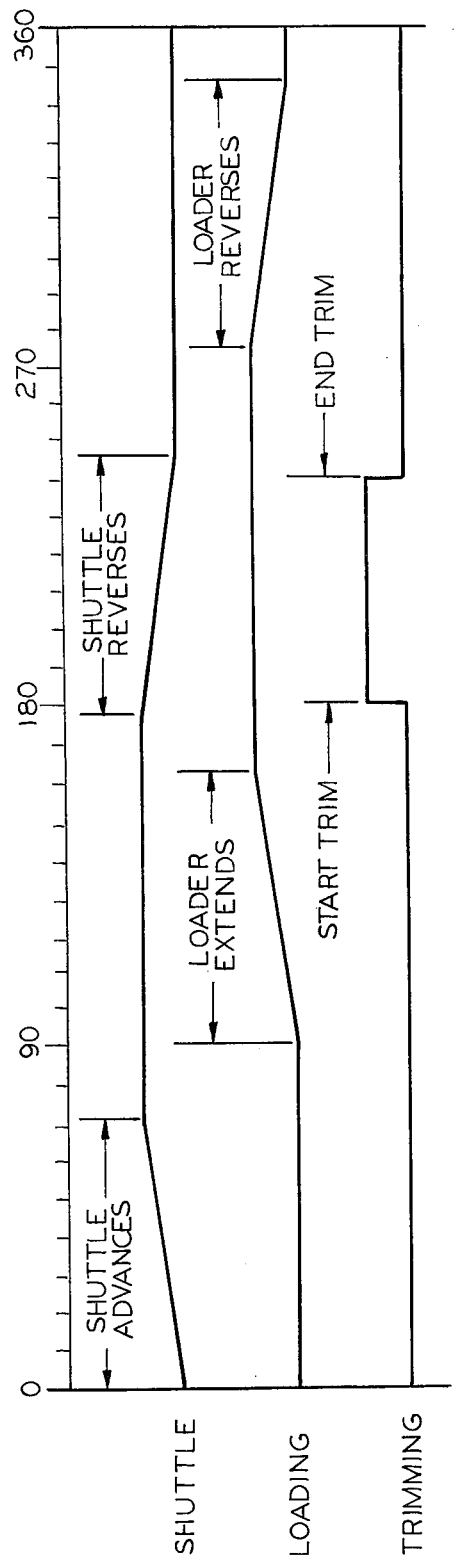

SHUTTLE TRANSFER MECHANISM

This invention relates to a machine for translating a work piece from a ready position to a work station and for discharging the work product.

The present invention was prompted by the realization of being able to simplify and enlarge the capability of a known mechanism employed to deliver closed bottom, open top shells of can form to a trimmer. Such shells are initially produced by drawing and ironing a thick-walled cup to develop a shell having a considerably longer and much thinner side wall. The free end of the shell is irregular (wavy) and must be trimmed to obtain a regular edge.

To trim the free edge, one method employed is to feed the shells one by one to a rotary turret of starwheel form which turns on an axis located between a trimmer and a loader. The turret has pockets in its periphery into which the shells to be trimmed are sequentially fed. The turret presents the shells in sequence (intermittent cam controlled movement) to the loader. The loader reciprocates in a cross-feed direction, moving a shell from the turret pocket laterally to a mandrel at a work station on the opposite side of the turret. The shell fits snugly over the mandrel, but with the irregular edge exposed, and by means of a rotary shear action the irregular end section is removed. The foregoing is disclosed in U.S. Pat. No. 3,714,854.

The turret has considerable mass, and its inertia inhibits attainment of an ideal indexing speed. The turret is indexed by a complex drive train, including a barrel cam and gears, which require considerable perfection to index the turret with precision, especially since these parts wear. Precision is necessary in order that a shell will be properly loaded on the mandrel.

The primary object of the present invention is to eliminate the rotary turret and its related indexing mechanism by employing a reciprocal slide of considerably reduced mass to move an untrimmed shell from ready position to loading position aligned with the mandrel. Another object of the invention is to utilize the slide as a means to deliver the trimmed shell. Another object of the invention is to so construct and operate the shuttle that it may be controlled by resolving the motion of the tool into a continuous control signal analog for commanding the motion and position of the shuttle, such as by the synchronous resolver disclosed in U.S. Pat. No. 3,714,854.

Another object of the invention is to enable the shuttle to be effectively loaded by gravity feed from a magazine.

Considering the untrimmed shell as a work piece to be presented to a tool at a work station, it will be appreciated from the disclosure to follow that the mechanism of the present invention may be utilized for translating a work piece other than a closed bottom, open ended shell requiring regularizing or evening of an irregular edge.

In the drawing:

FIG. 3A through 3F are schematic views showing sequencing;

FIG. 4 is a timing chart; and

Figure 1:
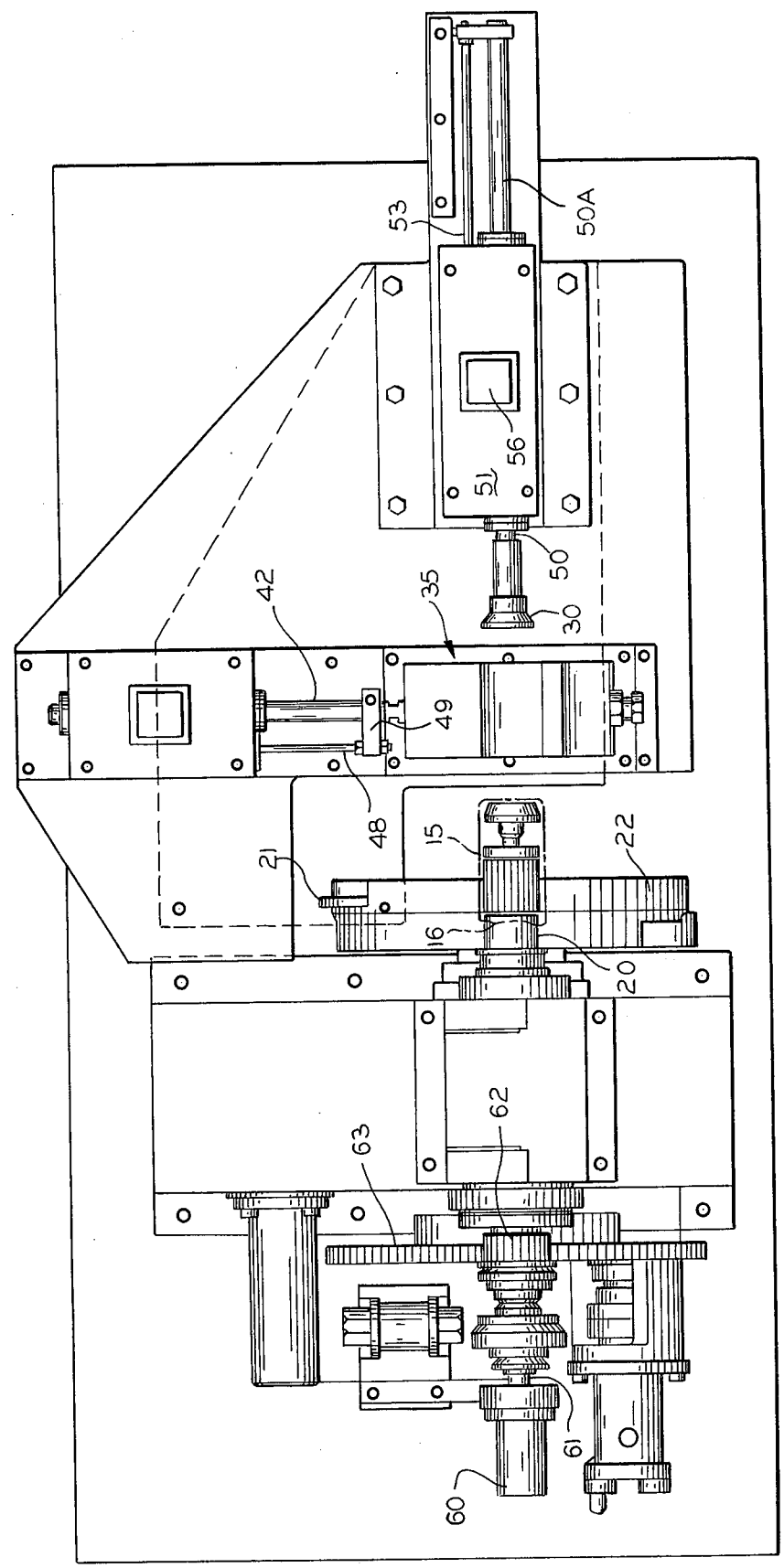
FIG. 1 is a plan view of a machine constructed in accordance with the present invention.
Figure 2:
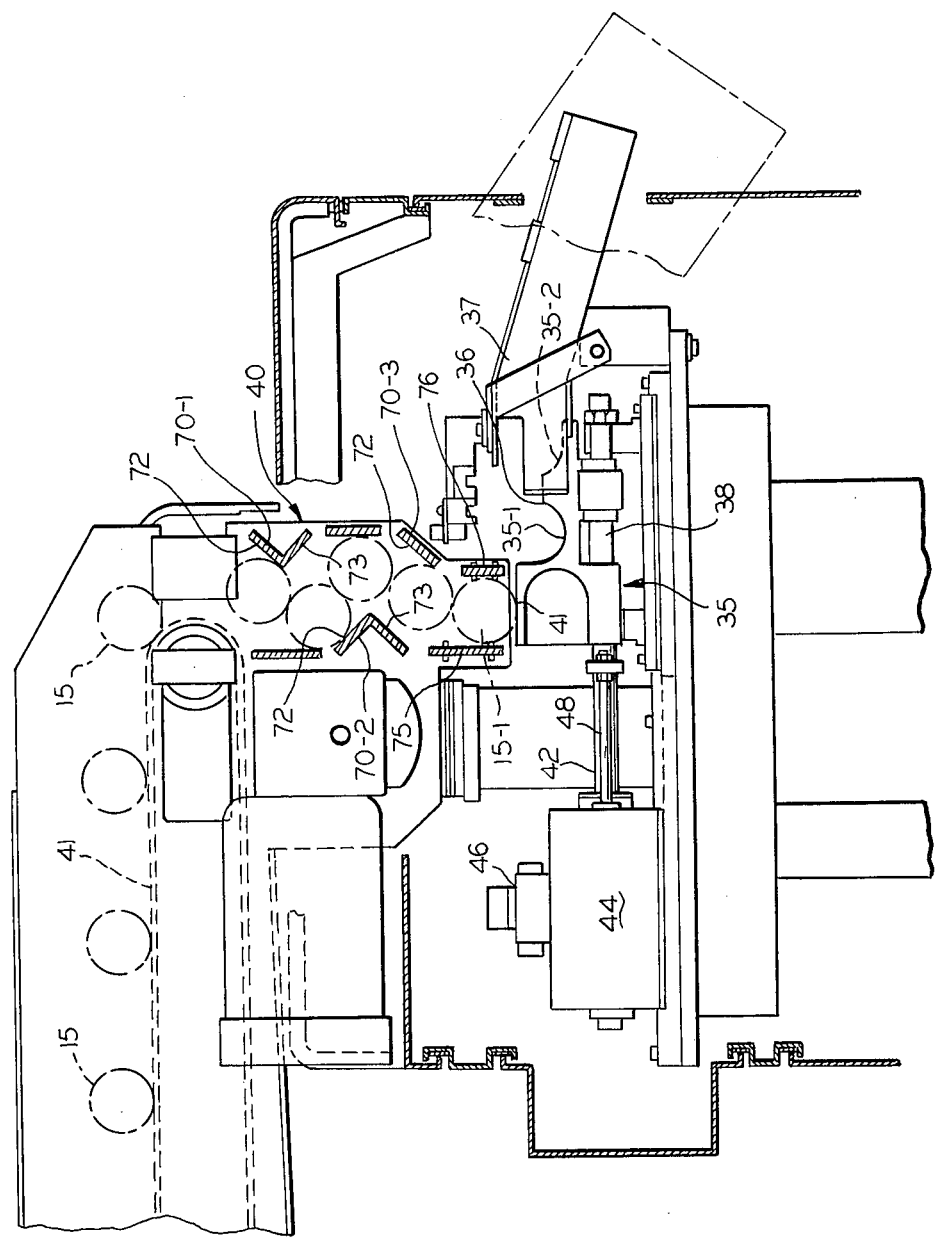
FIG. 2 is an end view of the machine shown in FIG. 1, partly in section.

The machine of the present invention shown in FIGS. 1 and 2 is concerned in particular with the production of closed bottom, open ended shells 15, FIG. 3A, of can configuration. The shell initially has a rough or uneven free edge to be trimmed to the dashed line 15D, resulting in the work product 15W, FIG. 3E, although, as mentioned above, the principle of the present invention is applicable to other forms of a work piece to have a tooling operation performed thereon.

The shell to be trimmed is to be transferred to a mandrel or holder 20, FIG. 1, with the free edge 16 in position to be sheered by a blade 21 carried on a rotary, cyclically operable disc 22. The blade 21 cooperates with an opposed cutting edge which is part of the mandrel assembly. The arc of blade 21 corresponds in dimension to the circumference of the shell.

The mandrel 20 and tool 21 may be viewed as defining the work station. The shells to be trimmed are loaded on the mandrel in sequence by a loader in the form of a reciprocal plunger 30 reciprocating on an axis which is coaxial with the axis of mandrel 20, FIG. 1. The loader defines a loading station. As will be evident in FIG. 1, movement of the shell or work product to the work station by the loader 30 requires that the shell be accurately positioned on the axis of the plunger 30, and that it be guided accurately to the work station.

Such positioning is accomplished by a shuttle 35, FIG. 2, which reciprocates along a horizontal path between the loader 30 and the mandrel 20. Transfer of the work piece to the mandrel occurs along a path transverse to the feed path of the shuttle.

As shown in FIG. 2, shuttle 35 is located beneath a vertical supply magazine 40, defining a supply station. The bottom of the magazine is open to afford a feed opening gated by the shuttle as will be explained. The shells to be trimmed are fed to the top of the magazine by a feed belt 41 and tumble from the feed belt downward into the magazine. A zig-zag guide (not shown) within the magazine produces a cascade gravity feed downward. The lower most shell 15-1, FIG. 2, is in ready position for delivery to the shuttle.

To receive a shell in ready position at the supply station, the shuttle 35 is provided with a pocket 35-1. To receive a trimmed shell unloaded from the mandrel, the shuttle includes a second pocket 35-2. The pockets are separated by an intervening land 36. Pocket 35-2 is open at the leading edge to enable the trimmed product to be discharged to a discharge chute 37 as will be explained.

The shuttle reciprocates on guides 38 between a retracted position and an advanced position. In the retracted position (see FIG. 3A) pocket 35-1 in the shuttle is directly beneath a shell in ready position which drops into the pocket. Also, in the retracted position, pocket 35-2 is centered on the loading axis, that is, pocket 35-2 is centered on the operating path of the loading plunger 30, FIG. 3A.

In the advanced position, (see FIG. 3B) pocket 35-1 is centered on the loading axis and at this time, FIG. 2, a rise or ledge 41 on the shuttle, rearward of pocket 35-1, blocks and therefore closes the exit opening at the bottom of magazine 40 to hold the lower-most shell in ready position. Thus, the shuttle incorporates a surface for gating the supply magazine as an incident to shuttle travel.

The shuttle 35 is reciprocated between the retracted position and the advanced position by a cylinder rod 42, FIG. 2, operated by hydraulic fluid under pressure in a cylinder 44. Translation of fluid under pressure within cylinder 44 is under control of an electro-mechanical servo valve 46.

The position and movement of the shuttle is constantly monitored by a transducer which resolves or translates movement of the cylinder rod (and therefore the shuttle) into a voltage analog. The transducer is preferably a linear variable differential transformer (not shown) located inside the cylinder block 44. The linear variable differential transformer is of known form as will be explained. In essence a rod 48, FIG. 1, is secured at one end by a clamp 49 to the cylinder rod 42. Rod 48 at the other end supports a core (not shown) which varies the induced voltage of the coils of a transducer inside the cylinder block 44.

The loader 30 is also reciprocated by a cylinder rod 50, operating in a cylinder 51, FIG. 1. The position and movement of the loading plunger 50 is also constantly monitored by a transducer in the form of a linear variable differential transformer (not shown). This transducer includes a core supported inside cylinder block 51 by a rod 53 in turn fastened to an extended end portion 50A of cylinder rod 50.

As in the instance of the cylinder for the shuttle feed rod, the cylinder 51 for actuating the cylinder rod 50 is controlled by an electro-mechanical servo valve 56.

By reciprocating the shuttle along a path transverse to the path of the loading plunger, and by guiding the shuttle beneath the loading plunger, it is possible to maximize efficiency of work piece translation in that the loader can be operated during idle periods of the shuttle and the shuttle can be operated during idle periods of the loader. Sequencing is shown in FIGS. 3A through 3F where the approximate positions of the shuttle and loader are related to the angular position of the rotary tool.

Referring to FIG. 3A, shuttle 35 is shown in a retracted position and the loading plunger 30 is also in its retracted position at the commencement of a cycle. At this time, the magazine gating surface 41 of the shuttle would be displaced rearwardly from the position shown in FIG. 2 to align pocket 35-1 with the work piece 15-1 in ready position. The work piece in ready position drops into pocket 35-1, thereby loading the shuttle with the work piece to be trimmed, as shown in FIG. 3A.

The timing of events is shown in FIG. 4. The shuttle, after being loaded, is advanced forwardly by extending cylinder rod 42, presenting the shell in pocket 35-1 on the center line that is common to the mandrel 20 and the loading plunger 30. The knife sector has travelled a little more than 70°. After the shuttle has attained its advanced position, the plunger is extended, FIG. 3B, to engage the bottom of the untrimmed shell incidental to transferring the work piece to the work station; gating surface 41 rearward of pocket 35-1 blocks the supply of shells at the supply station.

During the course of transferring the work piece to the work station by extending cylinder rod 50, the shuttle is idled, FIGS. 3B and 3C, enabling the plunger to transverse pocket 35-1. Pocket 35-1 is unloaded and the shell has been transferred to the mandrel or work holder. In the meantime the rotary tool 21 has been rotating from a zero position, FIG. 3A, clockwise as viewed in FIGS. 3A through 3F, to its effective position, attained after approximately 180° of rotation.

As the tool commences its work, FIG. 3D, the loading plunger is fully extended and continues to engage the bottom of the shell to hold it firmly in position on the mandrel. In as much as the plunger 30 is displaced from pocket 35-1 the shuttle is free to be retracted, since the land 36, which separates the shuttle pockets, clears the cylinder rod 50 positioned there above. Such retraction may commence just prior to the cutting tool commencing its action, as will be evident from the timing chart.

The trim operation is completed after the leading edge of the knife sector has attained a 245° position (approximate) and shortly thereafter the shuttle has attained its fully retracted position, enabling the next shell, at the bottom of the supply magazine, to drop into pocket 35-1.

When the trim is completed, pocket 35-2 of the shuttle (already retracted) is aligned with the mandrel, FIG. 3E. The trimmed shell 15W is unloaded from the mandrel by compressed air exerted on the inside of the trimmed shell as explained in U.S. Pat. No. 3,245,251. The trimmed shell follows the loader as the latter transverses pocket 35-2 in the course of being retracted. Shortly before the 360° position of the knife sector, while the shuttle is idle in its retracted position, delivery of compressed air for unloading the work product is interrupted; the trimed shell 15W comes to rest in pocket 35-2 and the loading plunger finally attains its home position.

In the next cycle of operation, as an incident to stopping the shuttle at the end of its forward travel, the work product represented by the trimmed shell 15W rolls out the open end of pocket 35-2 into the entrance of the discharge chute 37. Thus, as the shuttle comes to a sudden stop, the forward momentum of the trimmed shell carries it forward to the discharge chute.

It will be seen that when the shuttle has attained its advanced position it is idled (see FIG. 4) to allow the loader to accomplish the necessary transfer; the loader is idled as the shuttle translates the shell to the loading station; and the shuttle is idled in its retracted position as the work product is re-transferred from the work station to the product delivery pocket 35-2.

Sequencing of the shuttle and loader are related to the rotational cycle of the tool represented by the knife sector 21 on disc 22. To accomplish this a synchronous resolver 60, FIG. 2, of known form constantly generates a continuous analog signal of each increment of tool movement, which in the present instance will be the instantaneous rotary positions of the knife sector 21. This is achieved by mounting the synchronous resolver 60 on a shaft 61 driven synchronously with driven gear 62, meshed with driving gear 63, which rotates the knife disc.

The synchronous resolver 60 is of the kind disclosed in U.S. Pat. No. 3714854 which indeed controls a loader of the form described above. In essence (not shown herein) a coil rotating with driven shaft 61 in cooperation with a stationery coil inside the housing of the resolver 60 generates a voltage signal of sine wave form. This signal is demodulated and "shaped" to linear (trapezodial) form as disclosed in Pat. No. 3,714,854 to control the servo valve of the loader, the same as the loader described herein.

Under the present invention, the synchronous resolver 60 is equipped with a second coil to generate a separate command signal for controlling the shuttle servo valve 46. The principle is the same as disclosed in U.S. Pat. No. 3,714,854. Thus, the servo valve 46, FIG. 2, is similar to the servo valve identified by reference character 18 in U.S. Pat. No. 3,714,854.

Figure 5:
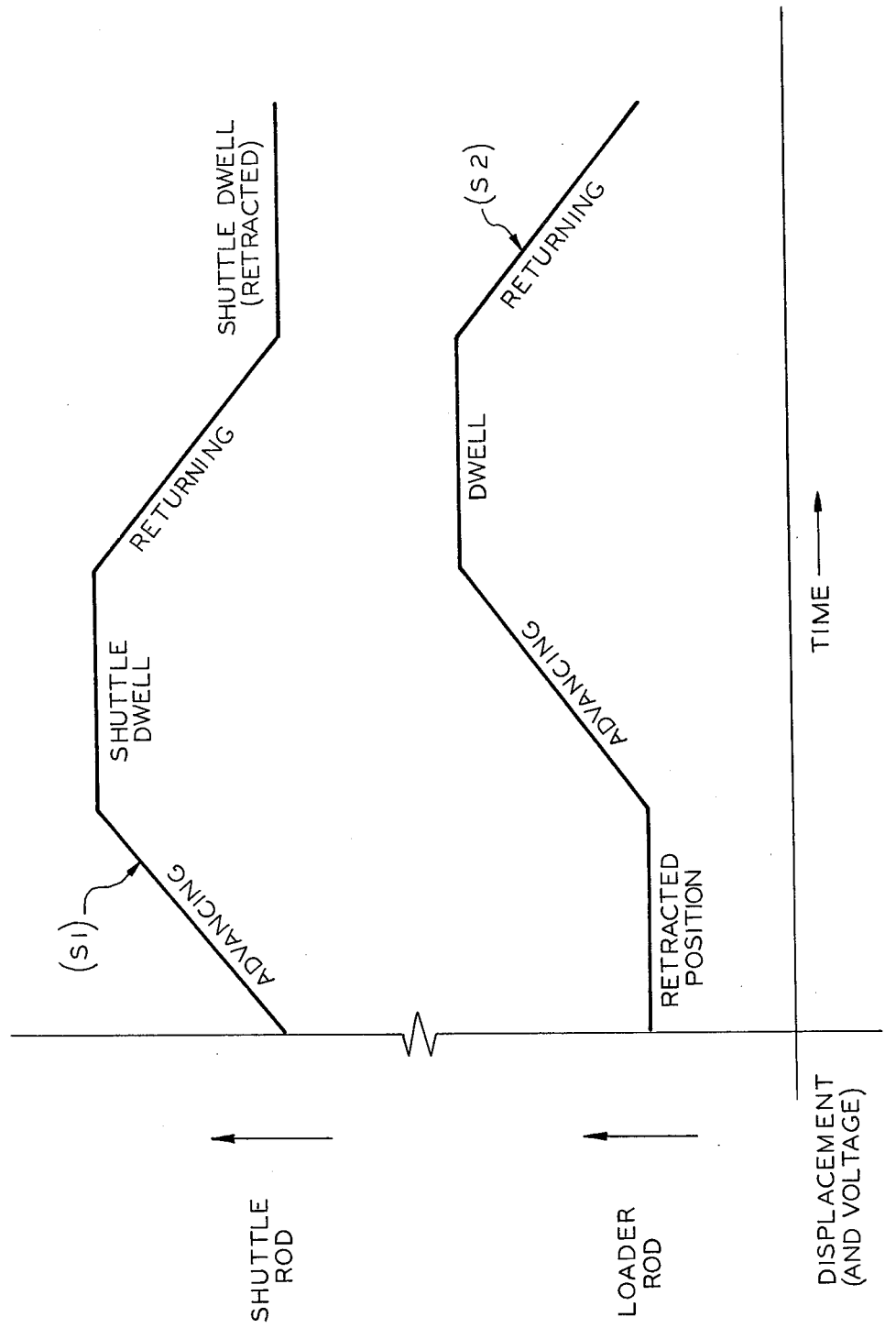
FIG. 5 shows displacement vs. time of certain parts of the machine.

FIG. 5 shows the relation between time on one hand and displacement of both the shuttle and loader on the other. In this connection, the resolver 60 and the demodulating means associated therewith generate two command signals of shaped form, displaced in time (out of phase). These voltage signals are proportional to the displacements shown in FIG. 5: one voltage signal (S1) of linear form is used to control the servo valve for the shuttle cylinder; the other (S2) is used to control the servo valve 56 for the loader. Each servo valve responds to the corresponding command signal emitted by the resolver and translates fluid to extend or retract the related cylinder rod, or place the cylinder rod in a dwell position in compliance with the timing shown in FIG. 4. At the same time, the transducer rods 48 and 53 are displaced in accordance with the movement and positioning of the cylinder rods for shuttle 35 and loader 30, respectively, and their transducers emit voltage analogs of opposite sign to voltages (S1) and (S2) enabling shuttle and loader positioning to be monitored for compliance with the command signal. Transducer monitoring is in accordance with the principle disclosed in U.S. Pat. No. 3,714,854 applied to the loader cylinder. As long as the command signal voltage varies, FIG. 5, shuttle or loader movement takes place; when the command signal is constant, dwell occurs.

The shells 15, FIG. 2, have thin side walls and because of the heavy, closed end they tend to tip, heavy end down, when in a state of free fall. The rough, free end is due to the thin-walled shell being drawn and ironed from a much shorter cup. Actual shell length in fact may vary by as much as an inch from one shell to the next, and it is therefore not possible to guide the shells with close fitting guides at both ends inside the magazine 40.

Due to these features (the heaviness of one end and the unpredictable length) considerable deviation would prevail during a free fall inside the magazine; constant monitoring by an attendant would be necessary to both assure that the shells settle parallel inside the magazine and that a shell is fed from the bottom of the supply magazine 40 in substantially true parallelism to the shuttle pocket 35-1.

Misalignment, that is, failure to square the shells being fed with respect to the shuttle pocket, can result in a wreck. Therefore, to assure sustained production, an irregular guide means is arranged inside the supply magazine constantly to maintain the longitudinal axis of each shell substantially squared to the vertical axis of the supply magazine, that is, the longitudinal axis of each shell is maintained substantially parallel to the longitudinal axis of pocket 35-1 in the shuttle.

In effect, the shells are constrained to follow an irregular or zigzag path which constantly corrects for alignment inside the supply magazine. Such constraint is attained by a plurality of vertically spaced, laterally opposed bumpers 70-1, 70-2 and 70-3 presenting alternating, oppositely directed, downwardly inclined upper surfaces as 72 which induce the desired gravity feed. The shells roll downward on the surfaces 72. A pair of vertically disposed, laterally spaced guides 75 and 76 are disposed at the bottom of the magazine. These two guides are laterally adjustable to assure the shell or similar cylindrical article drops accurately into the shuttle pocket.

The two bumpers 70-1 and 70-2 on opposite sides of the magazine are v-shaped, with their points opposed, and present lower surfaces 73 which are parallel to and cooperate with the opposed upwardly facing surfaces 72 spaced therefrom to cause re-bound, due to any bouncing, thereby constantly aligning or correcting the shells in a squared relationship to the vertical axis of the supply magazine. Thus, a squared relationship characterizing correct alignment is maintained as the shells roll on the surfaces 72, or as they re-bound. As this constant correction takes place with the shell above, it is transmitted by contact to the shell below. This is to be distinguished by the undesirable situation of a misaligned shell in a state of complete free fall, striking one below and misaligning it, which can result in a jam inside the magazine.

The extent of the surfaces 72 should be generous enough to assure enough support to have the shells rolling true on their own axes. Similarly, the extent of the surfaces 73 would be generous enough to assure that when re-bound takes place the axis of the shell remains trued. A surface about 3 inches across is adequate for shells of 6 to 8 inch length.

It will be seen from the foregoing the present invention enables the shuttle to be loaded sequentially with shells that are squared or true to the shuttle loading pocket, this being assured by the guiding bumpers inside the magazine which constrain the shells to follow a zigzag path while constantly truing the axes of the shells. The shuttle itself gates the supply magazine. If desired, a proximity sensor may be positioned inside the magazine midway between bumpers 70-1 and 70-2 to stop the machine (to conserve on wear and tear) if the supply is low.

Advantageously, a rotary turret and its mechanical indexing means may be supplanted by the present shuttle, which moves beneath the loading plunger; positioning and movement of the shuttle are timed to the loader, enabling the shuttle to be reciprocated when the loader is idle, and vice versa.

We claim:

1. In a machine having a cyclically operable tool at a work station and wherein a can body is to be moved forwardly in one direction from a ready position to a loading station and then transferred bodily from the loading station laterally to the work station which is located on one side of the loading station;

a shuttle reciprocal in said one direction between a retracted position and an advanced position, said shuttle having a first pocket presented to the ready position when the shuttle is in a retracted position, and having a second pocket located at the loading station when the shuttle is in its retracted position to receive a can body transferred thereto from the work station;

an extendable normally retracted loading plunger at the loading station positioned to be aligned with the first pocket when the shuttle is in its advanced position to transfer a can body therein to the work station bodily as aforesaid by extending the loading plunger, the path of the plunger being horizontal and transverse to the path of the shuttle;

means to bodily transfer the can body from the work station to the second pocket in the retracted position of the shuttle;

a cylinder rod operated by fluid pressure for reciprocating the shuttle and having an idle period in the advanced position of the shuttle during which said plunger is extended;

said second pocket having an open leading end enabling a can body therein to be discharged therefrom by its own momentum as the shuttle stops in its advanced position;

a supply magazine having a feed opening positioned to feed the can body by gravity drop from ready position to the first pocket in the shuttle when the shuttle is retracted;

said shuttle being guided for movement beneath the path of the loading plunger, whereby the shuttle may be retracted while the loading plunger is in its extended position;

said shuttle having a surface thereon to block the feed opening of the supply magazine in the advanced position of the shuttle, said pockets being separated by a land above which the plunger is positioned and said land lying in a plane above the lower surface of said second pocket.

2. A machine according to claim 1 wherein the supply magazine is provided with spaced bumpers defining a zigzag feed path and a pair of vertically disposed laterally spaced guides at the bottom of the magazine for guiding the work piece into the first pocket.

3. In a machine of the character described where a work piece located in ready position is advanced in one direction along a feed path to a loading station where a loader transfers the work piece laterally to a work station, located at one side of said path, to have an operation performed thereon by a cyclically operable tool, resulting in a work product to be re-transferred to the loading station and discharged as a work product;

a shuttle arranged for reciprocal movement along said path between a retracted position and an advanced position;

said shuttle having one pocket to receive the work piece located at ready position when the shuttle is retracted and a second pocket to receive the work product returned from the work station when the shuttle is retracted;

means to transfer the work piece from said one pocket laterally to the work station in the advanced position of the shuttle and means to return the work piece from the work station into the second pocket in the retracted position of the shuttle;

said second pocket having an open end to enable the work product to be discharged therefrom by its own momentum as the shuttle is stopped in its advanced position and said pockets being separated by a land lying in a plane above the lower surface of the second pocket;

a cylinder rod operating in a hydraulic cylinder to reciprocate the shuttle;

means to resolve cyclical motion of the tool into a voltage analog signal for commanding shuttle motion and shuttle positioning;

valve means responsive to the voltage analog signal to control translation of hydraulic fluid within the cylinder; and transducer means to monitor shuttle movement and shuttle position for compliance with said command signal.

4. A machine according to claim 3 in which the loader reciprocates horizontally at right angles to the feed path and in which the path of the shuttle is beneath the path of the loader.

5. A machine according to claim 3 in which the work piece at ready position is located for gravity feed therefrom within an open bottom supply magazine and in which the shuttle has a grating surface rearward of said one pocket to close the magazine in the advanced position of the shuttle.

6. A machine according to claim 5 in which the work piece at ready position is located for gravity feed therefrom within an open bottom supply magazine and in which the shuttle has a gating surface rearward of said one pocket to close the magazine in the advanced position of the shuttle.

7. A machine according to claim 5 wherein the work piece is of thin-walled elongated shell form, closed at one end and open at the other, the magazine having vertically spaced bumpers therein presenting spaced, oppositely directed, downwardly inclined surfaces and other surfaces, spaced therefrom in opposed relation, to define a zigzag feed path for the work piece.

* * * * *